No. 735,310. PATENTED AUG. 4, 1903.
J. M. STETTER.
FEEDER FOR HEADED ARTICLES.
APPLICATION FILED APR. 23, 1903.
NO MODEL. 3 SHEETS—SHEET 1.

Witnesses
Frank A. Fahle
J. A. Walsh

Inventor
John M. Stetter
By
Bradford & Hood
Attorneys

No. 735,310. PATENTED AUG. 4, 1903.
J. M. STETTER.
FEEDER FOR HEADED ARTICLES.
APPLICATION FILED APR. 23, 1903.
NO MODEL. 3 SHEETS—SHEET 2.
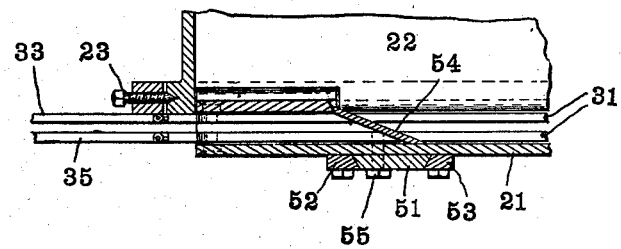
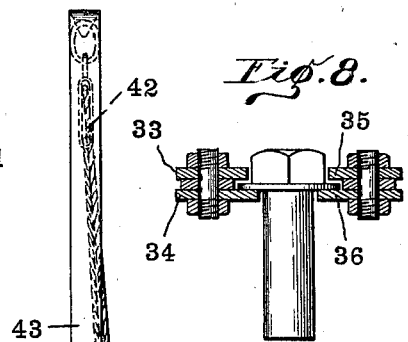
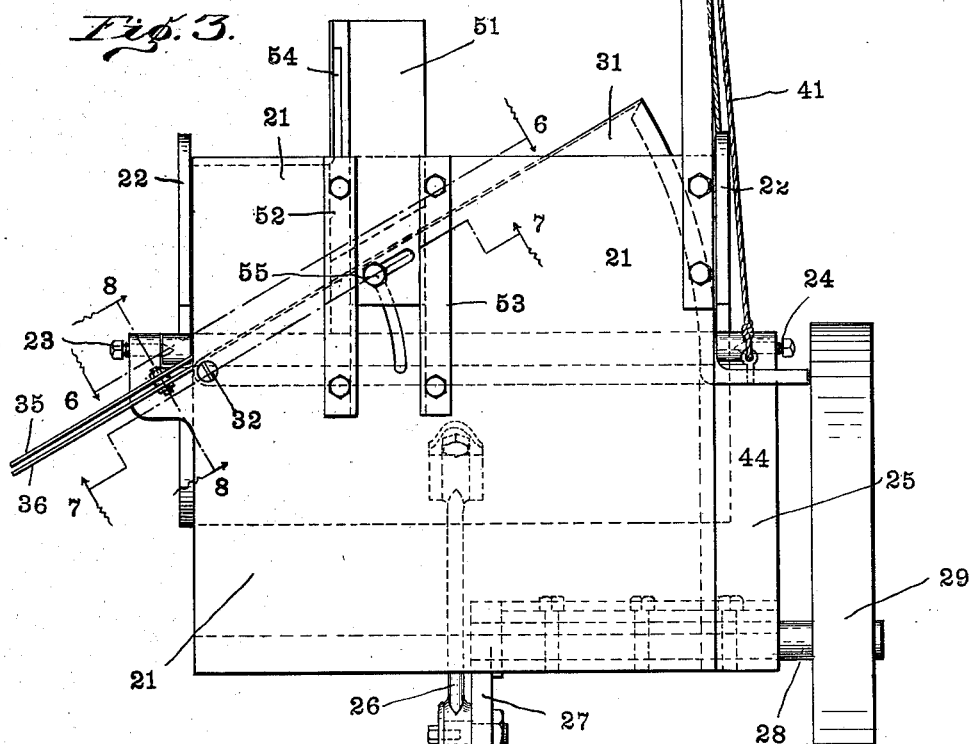
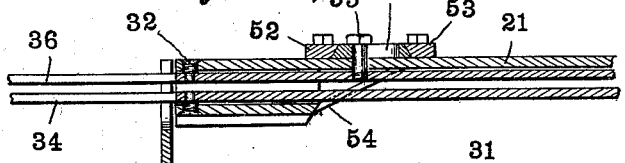
Witnesses
Frank A. Fahle
J. A. Walsh
Inventor
John M. Stetter
By Bradford & Hood
Attorneys No. 735,310. PATENTED AUG. 4, 1903.
J. M. STETTER.
FEEDER FOR HEADED ARTICLES.
APPLICATION FILED APR. 23, 1903.
NO MODEL. 3 SHEETS—SHEET 3.

Witnesses
Frank A. Fahle
J. A. Walsh

Inventor
John M. Stetter
By Bradford & Hood,
Attorneys

No. 735,310.

Patented August 4, 1903.

UNITED STATES PATENT OFFICE.

JOHN M. STETTER, OF MUNCIE, INDIANA.

FEEDER FOR HEADED ARTICLES.

SPECIFICATION forming part of Letters Patent No. 735,310, dated August 4, 1903.

Application filed April 23, 1903. Serial No. 153,999. (No model.)

*To all whom it may concern:*

Be it known that I, JOHN M. STETTER, a citizen of the United States, residing at Muncie, in the county of Delaware and State of Indiana, have invented certain new and useful Improvements in Feeders for Headed Articles, of which the following is a specification.

The object of my present invention is to provide a simple and effective mechanical feeder for supplying headed articles—such as bolts, screws, and the like—to other machines for further treatment.

Figure 1:
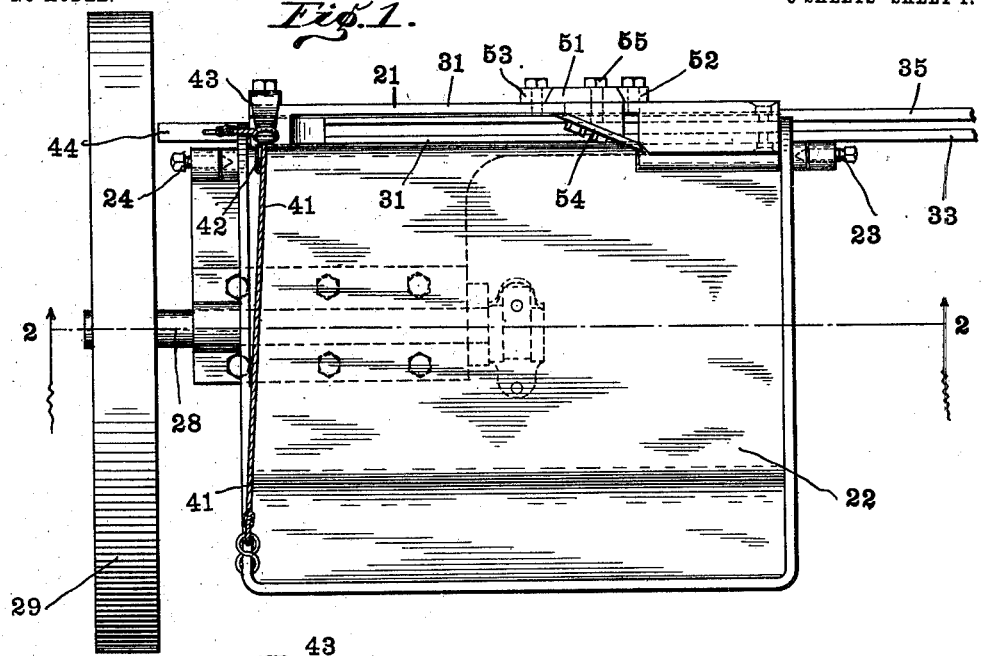
Figure 2:
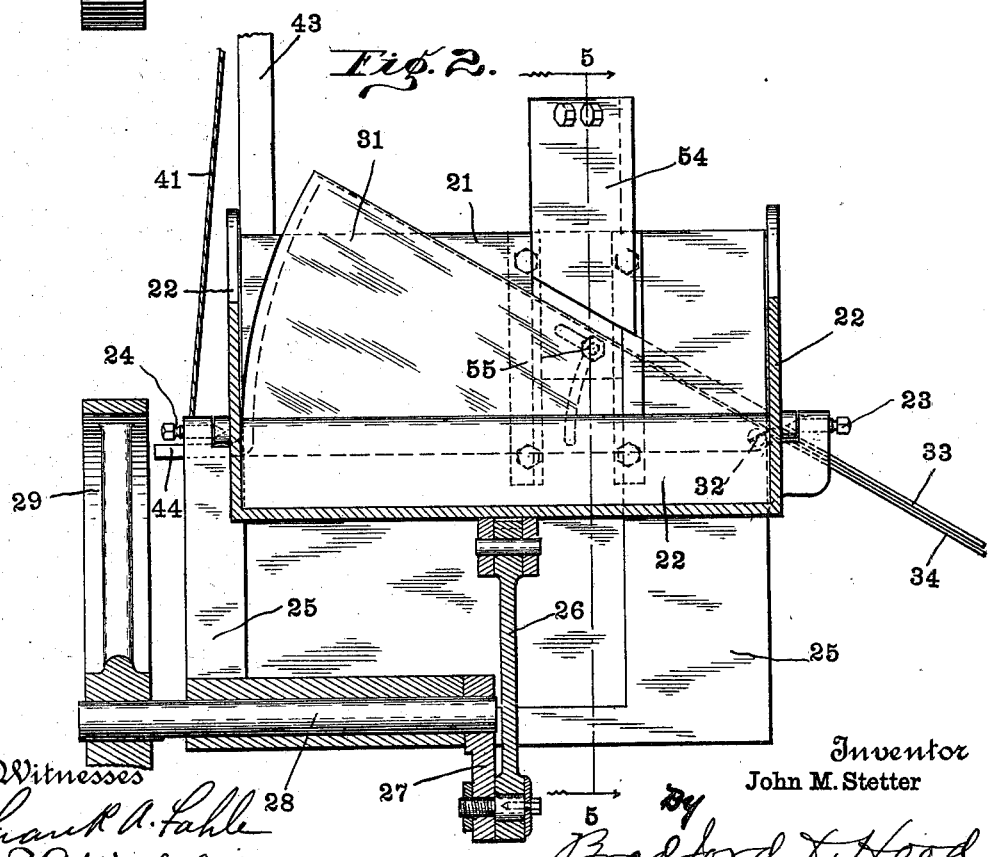
Figures 4, 5:
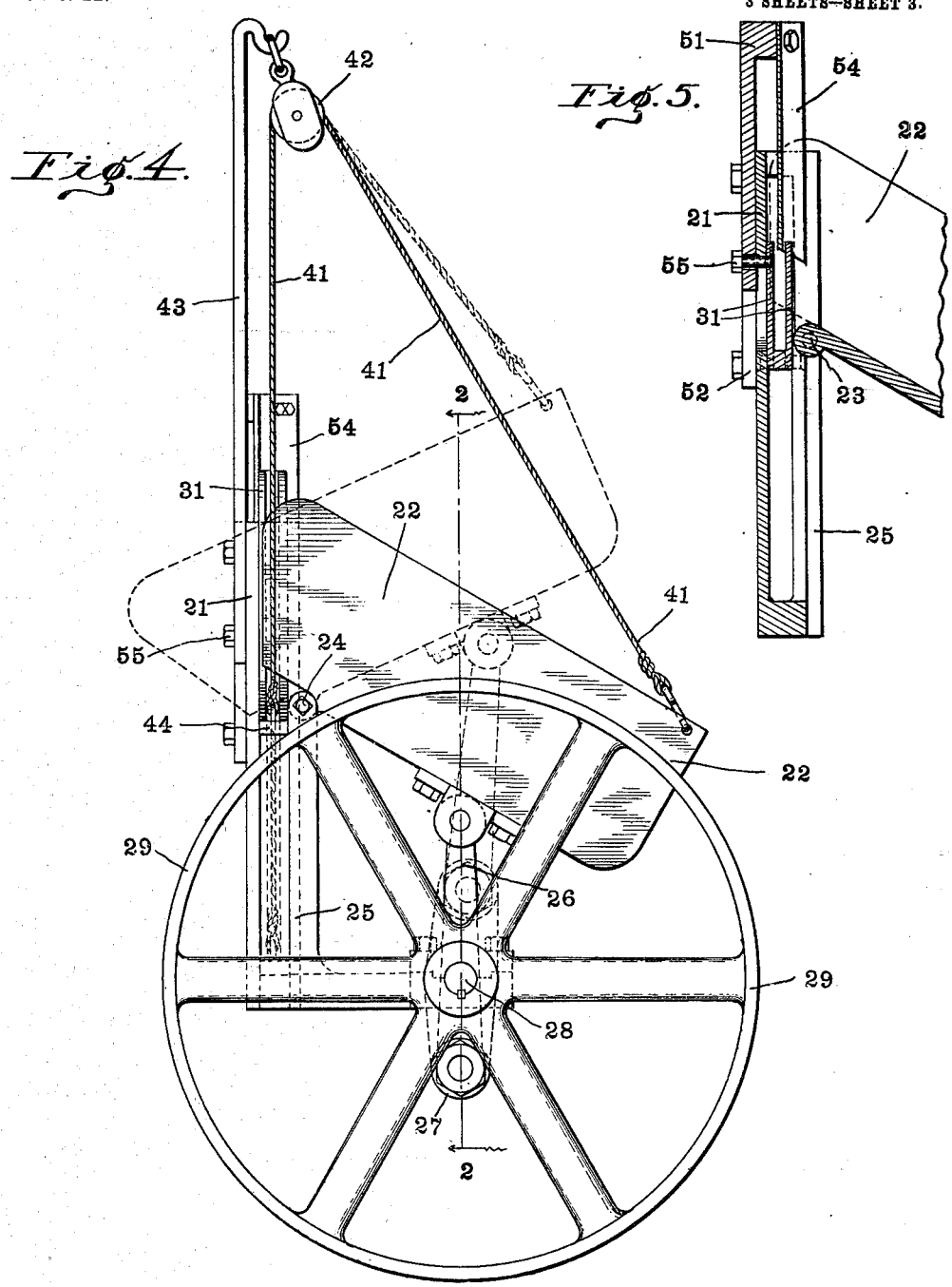

Referring to the accompanying drawings, which are made a part hereof, and on which similar reference characters indicate similar parts, Figure 1 is a top or plan view of a feeder embodying my said invention; Fig. 2, a sectional front elevation as seen when looking in the direction indicated by the arrows from the dotted lines 2 2 in Figs. 1 and 4; Fig. 3, a rear elevation thereof; Fig. 4, a side elevation showing the elevated position of the hopper by means of dotted lines; Fig. 5, a detail sectional view as seen when looking in the direction indicated by the arrows from the dotted line 5 5 in Fig. 2; Fig. 6, a detail sectional view as seen when looking downwardly from the dotted line 6 6 in Fig. 3; Fig. 7, a similar view looking upwardly from the dotted line 7 7 in Fig. 3; and Fig. 8, a detail transverse section through the inclined off-bearing guideway on the dotted line 8 8 in Fig. 3.

This machine consists, in the main, of a hopper for containing the articles to be fed—such as bolts, bolt-blanks, and the like—composed of a stationary back side 21 and a rocking structure 22, which includes the bottom, the sides, and the front of the hopper. The ends of the hopper sides, as shown in Fig. 4, are adapted, as the rocking structure rises, to move past the ends of the back. This rocking structure 22 is mounted by means of suitable pivots 23 and 24 on the frame 25, which frame is either integral with the back 21 or has the said back rigidly secured upon it. The necessary motion is imparted to the structure 22 by a pitman 26, driven by a crank 27 on the driving-shaft 28, which is in turn driven from some suitable source of power by a belt (not shown) running to a pulley 29 on said shaft. The limit of movement is indicated by the positions shown by the full and dotted lines, respectively, in Fig. 4.

Within the hopper, just in front of the stationary back 21, is the vibrating receiver 31, which is mounted at a point just below the hopper-bottom on the pivot 32. At its pivoted end this receiver 31 registers with the off-bearing guideways, which, as best shown in Figs. 2 and 3, incline downwardly, so that the articles being handled will slide down them to the machine to which they are being fed after being delivered thereto from the vibrating receiver. These inclined guideways are preferably constructed of four small rectangular bars 33, 34, 35, and 36, secured together at suitable intervals by bolts and washers, thus providing channels horizontally and uninterrupted slots vertically to receive and guide the structures. The enlarged detail sectional view Fig. 8 both shows this construction clearly and illustrates the position of a machine-bolt or bolt-blank when the device is used in feeding such bolts or blanks.

The vibrating receiver 31 is slotted or channeled similarly to the off-bearing guideways and extends substantially across the hopper and is arranged adjacent to its stationary back, as before stated. It is arranged to rise and fall synchronously with but oppositely to the rock-hopper structure. This result is secured by connecting these two structures together by means of a rope 41, running over a sheave 42, which is supported by an upright post 43, the ends of said rope being connected, respectively, to an arm 44 on the vibrating receiver and to the side of the hopper structure 22, as is best shown in Fig. 4 of the drawings. With this arrangement as one structure rises the other will obviously descend, and vice versa, with the result that when the hopper structure is at its highest point the top of the vibrating receiver is at its lowest point and is substantially parallel with the bottom of the hopper at its then lowest edge, so that the bolts or bolt-blanks or other devices contained in the hopper are thrown onto the upper edge of said vibrating receiver, and thus, as will be readily seen, the points of such bolts or blanks will fall down into the slot or channel, while the heads thereof will rest upon the edges of the structure bounding such channel. Then as the hopper structure descends and the vibrating receiver rises the tendency will be for such bolts or blanks to slide down the upper inclined edge of said receiver and be discharged therefrom into the inclined off-bearing guideways.

To insure regularity of delivery from the vibrating receiver to the off-bearing guideways, a "sweep" is necessary to prevent bolts or blanks not properly entered in the channel of the receiver from passing down and clogging at the egress-point. I have therefore provided an adjustable reciprocating sweep for this purpose. This consists of a vertical slide 51, mounted in ways 52 and 53 on the hopper-back 21, and a sweep-plate 54, secured thereto on the inner side of the hopper-back and extending diagonally across the vibrating receiver 31, as is best shown in Fig. 1. The lower edge of this sweep-plate is cut inclined, so as to substantially conform to the inclination of the vibrating receiver when the latter is in its highest or delivering position. The sweep-plate is to be adjusted a distance from the vibrating receiver substantially equal to the thickness of the heads of the bolts or blanks being operated upon, so that said heads will pass below said sweep when properly arranged, but will be swept back and thrown off thereby when not in proper position. This sweep-plate is secured to and moves with the vibrating receiver. It is secured to said receiver by means of the stud pin or bolt 55, carried by said plate, and which passes through a slot in the slide 51. There is also a curved slot in the hopper-back 21, struck on the arc of a circle from the axis on which the vibrating receiver moves. This last-named slot permits of the necessary up-and-down movement, while the first-named slot enables the pivot-bolt 55 to travel transversely of the slide 51 as the latter moves up and down, this being necessary on account of the divergence in lines of travel of the vibrating carrier and said slide.

The operation may be described as follows: A suitable quantity of the articles to be fed forward are thrown into the hopper. In the bolt-factory the bolt-blanks (which are to be trimmed or otherwise treated and for which my machine has been especially designed) are shoveled into said hopper. As the rocking hopper structure 22 rises the bolt-blanks are thrown to the rear side of the hopper onto the vibrating receiver 31, into the channel whereof the stems of a considerable number of bolts will enter, while the heads will rest on the upper edges thereof. When the hopper structure 22 descends and the vibrating receiver 31 rises, the bolts which have been received properly by the latter will slide downwardly toward the exit, whence they will pass to the off-bearing guideways. Those which are not properly positioned will be swept off by the sweep 54. This operation is continuously repeated, and the consequence is the off-bearing guideways, which lead to the other machine, are kept constantly loaded, and the machine to be fed is kept supplied with its work with regularity and with but little manual labor.

Having thus fully described my said invention, what I claim as new, and desire to secure by Letters Patent, is—

1. The combination, in a feeder for headed articles, of a hopper composed of a stationary back and a rocking structure comprising the bottom ends and front, and a vibrating receiver located within the hopper adjacent to the back thereof having a channel in its upper surface to receive the stems of the articles being handled, means for rocking said hopper and vibrating said receiver arranged to cause one to rise as the other descends, and a guideway onto which the articles are discharged from the receiver.

2. The combination in a feeder for headed articles, of a stationary hopper-back, a rocking hopper structure comprising the bottom ends and front of said hopper, a pivoted vibrating channeled receiver, and a sweep comprising a slide mounted on the frame and arranged to move synchronously with said receiver and extending across the same.

3. The combination, in a feeder for headed articles, of a hopper, a pivoted vibrating receiver arranged adjacent to the hopper-back, and a sweep for throwing off improperly-arranged articles from the receiver comprising a vertically-movable slide mounted on the frame of the feeder and having a transverse slot, said receiver being provided with a stud on its side which extends out and engages with said slot, the adjacent wall of the hopper-structure being also provided with an opening through which said stud extends concentric with the axis on which said receiver vibrates.

4. The combination, in a feeder for headed articles, of a rocking hopper-body having a back near its pivot-point, a vibrating receiver arranged within the hopper adjacent to said back, and a connection between said rocking hopper-body and said vibrating receiver whereby as one rises the other will descend.

5. The combination, in a feeder for headed articles, of a rocking hopper-body, a vibrating receiver arranged therein and pivoted at one end, and an off-bearing guideway adapted to register with said pivoted and discharging end of the vibrating receiver composed of four parallel bars arranged as shown for receiving and guiding the articles by their heads.

In witness whereof I have hereunto set my hand and seal, at Indianapolis, Indiana, this 15th day of April, A. D. 1903.

JOHN M. STETTER. [L. S.]

Witnesses:
CHESTER BRADFORD,
JAMES A. WALSH.